United States Patent [19]
Liebing et al.

[11] Patent Number: 5,416,838
[45] Date of Patent: May 16, 1995

[54] TELEPHONE RECEIVER WITH ADJUSTABLE SUPPORT FOR BASE AND HANDSET

[75] Inventors: Ullrich Liebing, Feucht; Peter Hirth, Erlangen; Jürgen Höflinger, Röthenbach; Wilhelm Wekerle, Nürnberg, all of Germany

[73] Assignee: U.S. Philips Corporation, New York, N.Y.

[21] Appl. No.: 179,894

[22] Filed: Jan. 10, 1994

Related U.S. Application Data

[63] Continuation of Ser. No. 881,907, May 12, 1992, abandoned.

[30] Foreign Application Priority Data

May 21, 1991 [DE] Germany .............. 4116494

[51] Int. Cl.6 .................................. H04M 1/00
[52] U.S. Cl. ................... 379/436; 379/428
[58] Field of Search ............ 379/428, 449, 450, 446, 379/447, 433, 435, 436; 312/223.4; D14/151, 253

[56] References Cited

U.S. PATENT DOCUMENTS

| | | | |
|---|---|---|---|
| D. 279,289 | 6/1985 | Bhat et al. | 379/D65 |
| D. 310,524 | 9/1990 | Utsuki et al. | 379/436 |
| 2,473,106 | 6/1949 | Mathieson | 379/447 |
| 2,878,324 | 3/1959 | Guerrero | 379/447 |
| 4,568,801 | 2/1986 | Gates et al. | 379/435 |
| 4,819,266 | 4/1989 | Awakowicz et al. | 379/454 |
| 5,131,034 | 7/1992 | Read | 379/435 |

FOREIGN PATENT DOCUMENTS

| | | | |
|---|---|---|---|
| 3625646 | 2/1988 | Germany . | |
| 232729 | 9/1988 | Japan | 379/447 |

Primary Examiner—James L. Dwyer
Assistant Examiner—Jack Chiang
Attorney, Agent, or Firm—David R. Treacy

[57] ABSTRACT

A pivotal bracket is attached to the base of a telephone receiver to permit a user to adjust the angle of the base. Preferably the bracket is wider than the base, and extends to one side to provide support for the handset. The bracket may be slidable along the pivot axis to permit user selection of the side on which the handset can be rested.

7 Claims, 1 Drawing Sheet

TELEPHONE RECEIVER WITH ADJUSTABLE SUPPORT FOR BASE AND HANDSET

This is a continuation of application Ser. No. 07/881,907, filed May 12, 1992, now abandoned.

BACKGROUND OF THE INVENTION

The invention relates to a telephone receiver station with a handset and a control panel.

High requirements are imposed on telephone receiver stations as regards their ergonomics and design, especially when they are provided for the purpose of office communication. The publication "Siemens Teamset 200—Design, Ergonomie und konstruktiver Aufbau mikroprozessorgesteuerter Bürotelefonanlagen" by H. Hansbauer, telcom report 5, Vol. 5, 1982, pp. 298–302 describes telephone receiver stations which comprise a handset, a control panel and a display. A good legibility of the control panel (keyboard and further controls) and of the display combined with an easy operation is to be achieved in the devices described by means of an intermediate adjustment angle of the control panel and the display. For professional use, for example in information or telephone exchange stations, such solutions are hardly suitable since an adaptation to individual requirements of users is not very well possible.

SUMMARY OF THE INVENTION

The present invention, therefore, has for its object to provide an improvement of telephone receiver stations of the kind mentioned above. This object is achieved by means of a substantially rectangular bracket which comprises two mutually facing studs which enter the telephone receiver station sideways and by means of which the bracket is pivotably journalled in the telephone receiver station, where it can be fixed by locking means. The bracket provided as a support for the telephone receiver station renders a variation in the adjustment angle of the telephone receiver station, and thus of the control panel possible. A user can then easily optimize the adjustment angle of the telephone receiver station according to his own personal requirements.

An advantageous embodiment of the invention is characterized in that the bracket is wider than the telephone receiver station, so that a stud of the bracket forms a rest for the telephone handset. This provides the advantage that a separate handset rest is redundant, especially in telephone receiver stations without handset rest switch (information station, broker's telephone).

A further embodiment is characterized in that the bracket is journalled with horizontal sliding possibility. It is achieved by this that the handset rest can be moved to the left-hand or the right-hand side of the telephone receiver station, as required, through sliding of the bracket, so that an adaptation is possible for left-handed or right-handed users.

In a further advantageous modification, the telephone receiver station has a display which is pivotably journalled. In this modification, the adjustment angle of the display can be set independently of the adjustment angle of the telephone receiver station by its individual user. To keep the manufacturing cost of such telephone receiver stations low, it is suggested that an axis defined by the bracket in the telephone receiver station at the same time forms the pivot axis for the pivotably journalled display.

The locking means provided for maintaining a given adjustment angle may be formed by detents. When detents are used, certain adjustment angles of the bracket only are possible, depending on the number of teeth. When a detent is used, the handset rest may be moved to the other side in that, for example, the bracket is constructed so as to be detachable from the telephone, so that the handset rest can be moved through removal of the bracket, rotation through 180°, and re-insertion into the telephone.

An advantageous continuous adjustment possibility of the adjustment angle is achieved through the use of clamps, which are based on friction forces. In addition, the horizontal sliding possibility of the bracket referred to above can be realized without problems when frictional clamping is used.

The invention will be described and explained in more detail below with reference to the embodiment which is diagrammatically depicted in the Figures.

DESCRIPTION OF THE PREFERRED EMBODIMENT

Figure 1:
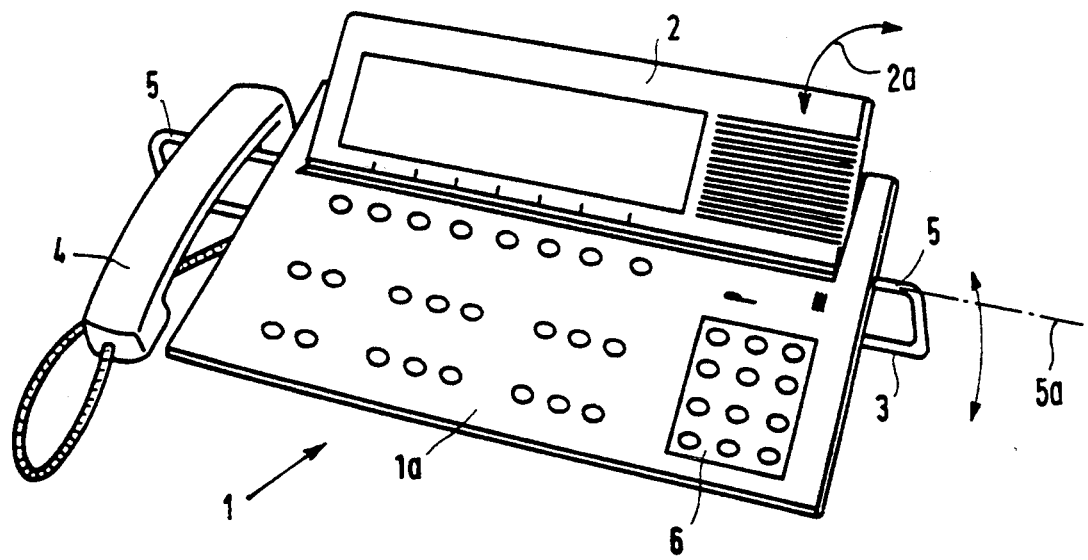
FIG. 1 is a perspective view of a telephone receiver station with adjustable bracket.

FIG. 1 is a perspective view of a telephone receiver station 1 with a pivotably journalled display 2 provided in the rear portion of a base 1a of the telephone receiver station 1. The display 2 is pivotable as shown by the double arrow 2a. A rectangular bracket 3 is also provided in the rear portion of the telephone receiver station 1, a longitudinal side of the bracket 3 being formed by two studs 5 facing one another and entering the base 1a sideways at opposing sides. The studs 5 of the bracket 3 are pivotably journalled about an axis 5a which is the same as that for pivoting of display 2 in the base 1a and can be fixed with locking means. The bracket 3 may thus be held at various adjustment angles including intermediate angles and be used as a support for the base 1a. The adjustment angle of the base 1a can be changed through pivoting of the bracket 3 in the direction of the arrow shown in FIG. 1, so that an optimum adaptation to individual requirements of a user is rendered possible in conjunction with the adjustment possibility of the display 2. One stud 5 of the bracket 3 at one side of the base 1a forms a rest for a handset 4 of the telephone receiver station 1. This is achieved in that the bracket 3 is constructed so as to be wider than the base 1a, and the resulting projecting portion of the stud 5 is used as a rest. In addition, the bracket 3 is so journalled in the base 1a that it can be shifted horizontally, so that the handset may be rested on the other side of the base 1a in a simple manner, by which the problem of left-handed and right-handed users is solved.

The display 2 is preferably journalled about the axis 5a.

Figure 2:
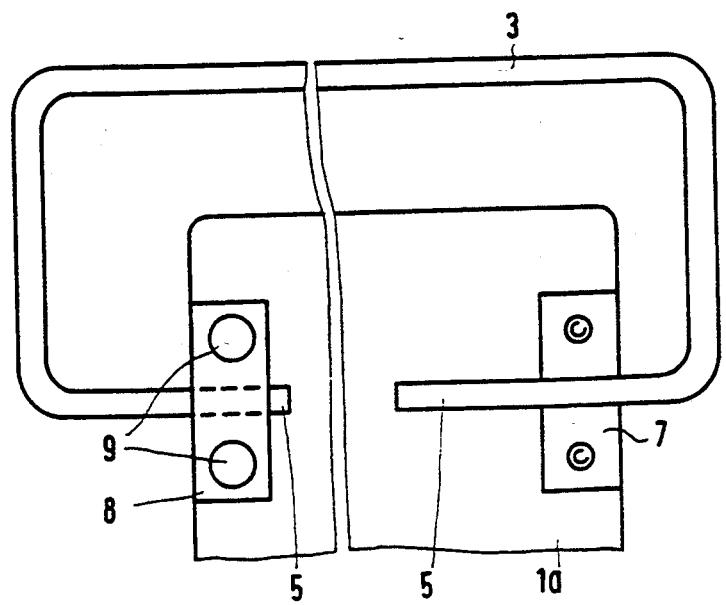
FIG. 2 is a section of the lower side of the telephone receiver station of FIG. 1.

FIG. 2 shows a section of the device of FIG. 1 seen from below. Identical parts are given the same reference numerals. The rectangular shape of the bracket 3 is interrupted in the longitudinal side lying inside the telephone receiver station 1, resulting in two mutually facing studs 5. Such a bracket 3 may be readily manufactured, for example, through multiple bending through fight angles of a suitable metal rod. Journalling of the studs 5 of the bracket 3 inside the telephone receiver station 1 takes place by means of two locking clamps lying against the inner side wall of the telephone receiver station 1, each formed by two opposing clamp parts 7 and 8 which enclose the stud 5. The clamping pressure between the clamp parts 7 and 8, and thus the frictional forces exerted on the interposed stud 5, is achieved by means of two screws 9. The frictional forces acting on the bracket may be varied or lifted by tightening these screws 9 more or less strongly. A continuous adjustment possibility of the adjustment angle of the bracket 3 is achieved by this method of journalling and locking on the one hand, while on the other hand the handset can be moved to the other side of the telephone receiver station 1 without any problem in that the screws 9 are loosed, the bracket 3 is shifted, and the screws 9 are tightened again.

We claim:

1. A telephone receiver station comprising a base including a control panel, and a handset,
    characterized by comprising a bracket for supporting said base at a user-optimized variable adjustment angle, said bracket being wider than said base and including a portion extending to one side of said base to form a rest for said handset,
    means for pivotally journalling said bracket in said base about an axis through various adjustment angles including intermediate adjustment angles, to allow positioning the bracket at a user-selected one of said various adjustment angles with respect to the base, and thereby support said base at said user-optimized variable adjustment angle, and
    locking means for fixing the bracket at said user-selected one of said various adjustment angles with respect to said base.

2. A telephone receiver station as claimed in claim 1, characterized in that said station further includes a display which is pivotally journalled to said base about said axis.

3. A telephone receiver station comprising a base including a control panel, and a handset,
    characterized by comprising a bracket for supporting said base at a user-optimized variable adjustment angle, said bracket being wider than said base and including a portion extending to one side of said base to form a rest for said handset, said bracket being movable with respect to said base without detachment therefrom to permit extension of part of said bracket to a side of said base opposite said one side to form said rest,
    means for pivotally journalling said bracket in said base about an axis through various adjustment angles including intermediate adjustment angles, to allow positioning the bracket at a user-selected one of said various adjustment angles with respect to the base, and thereby support said base at said user-optimized variable adjustment angle, and
    locking means for fixing the bracket at said user-selected one of said various adjustment angles with respect to said base.

4. A telephone receiver station as claimed in claim 3, characterized in that said bracket is elongated, and said part and said portion are opposite ends of said bracket.

5. A telephone receiver station as claimed in claim 4, characterized in that said bracket is slidable along said axis to permit user selection of the side of the base on which the handset is supported.

6. A telephone receiver station as claimed in claim 5, characterized in that said locking means is formed by at least one clamp for exerting frictional force to said bracket, and thereby permit continuous adjustment through said various adjustment angles, said clamp also clamping the bracket by frictional force against slidable movement with respect to the base.

7. A telephone receiver station as claimed in claim 6, characterized in that said station further includes a display which is pivotally journalled to said base about said axis.

* * * * *